United States Patent
Haneda (10) Patent No.: US 10,250,760 B2
(45) Date of Patent: Apr. 2, 2019

(54) IMAGING DEVICE, IMAGING SYSTEM, AND IMAGING METHOD

(71) Applicant: OLYMPUS CORPORATION, Hachioji-shi, Tokyo (JP)

(72) Inventor: Kazuhiro Haneda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/465,747

(22) Filed: Mar. 22, 2017

(65) Prior Publication Data

US 2017/0295286 A1 Oct. 12, 2017

(30) Foreign Application Priority Data

Apr. 12, 2016 (JP) .................................. 2016-079456

(51) Int. Cl.
*H04N 1/00* (2006.01)
*H04N 5/262* (2006.01)

(52) U.S. Cl.
CPC ....... *H04N 1/00129* (2013.01); *H04N 5/2628* (2013.01); *H04N 2201/0084* (2013.01)

(58) Field of Classification Search
CPC ............. H04N 1/00129; H04N 5/2628; H04N 2201/0084

USPC ........................................ 348/333.01-333.09
See application file for complete search history.

(56) References Cited

U.S. PATENT DOCUMENTS 9,344,618 B2 * 5/2016 Min ........................ H04N 5/247
2010/0066865 A1 * 3/2010 Sakamoto .............. H04N 5/232
348/240.99

FOREIGN PATENT DOCUMENTS

JP         2011-205232         10/2011

* cited by examiner

*Primary Examiner* — Yogesh K Aggarwal
(74) *Attorney, Agent, or Firm* — John C. Pokotylo; Pokotylo Patent Services (57) ABSTRACT

An imaging device comprising: an imaging sensor; a processor including a magnification processing section which magnifies a part of an image captured by the imaging sensor to generate a magnified image, a display device to display an image, and a transmission circuit to transmit an image to an external device, wherein the display device displays the magnified image generated by the magnification processing section of the processor, and wherein the transmission circuit transmits a non-magnified image not subjected to magnification processing by the magnification processing section of the processor.

10 Claims, 4 Drawing Sheets

IMAGING DEVICE, IMAGING SYSTEM, AND IMAGING METHOD

CROSS-REFERENCE TO RELATED APPLICATIONS

Benefit is claimed, under 35 U.S.C. § 119, to the filing date of prior Japanese Patent Application No. 2016-079456 filed on Apr. 12, 2016. This application is expressly incorporated herein by reference. The scope of the present invention is not limited to any requirements of the specific embodiments described in the application.

BACKGROUND OF THE INVENTION

1. Field of the Invention

The present invention relates to imaging devices, imaging systems, and imaging methods capable of communicating with an external device.

2. Description of Related Art

There are commercially available imaging devices and external display devices capable of communicating between an imaging device, such as a digital camera, and an external display device, such as a liquid crystal display, receiving a live view image or the like captured by the imaging device, and displaying the live view image or the like on the external display device. In order to achieve a reduction in size of an imaging device body, a compact and lower-resolution type TFT (Thin Film Transistor) to be arranged as a rear display is usually employed. On the other hand, as the external display device, a display which is larger and has a higher resolution and more excellent visibility than the display device of the imaging device can be utilized. Use of this external display device enables to perform photographing while confirming a higher-definition live view.

In an imaging system combining the above-described imaging device body and external display device, it is also possible to simultaneously display live view images on two display devices, i.e., the rear TFT of the imaging device and the external display device, and to perform photographing that cannot be performed only with the imaging device.

For example, in an image display system of Japanese Patent No. 5618587, there is disclosed a function to magnify and reduce a live view image to be displayed on an external display device. This image display system displays a magnified live view image (hereinafter, described as magnified live view) on the external display device and allows to precisely confirm whether a subject (e.g., the person's face) is in focus. At the same time, it displays a non-magnified live view image (hereinafter, described as normal live view) on the display device of the imaging device and allows to perform photographing while confirming the entire composition. Further, since photographing is performed while moving a camera at the time of moving image photographing, it is possible to confirm the composition and, at the same time, whether a subject (e.g., the person's face) is in focus.

There is a commercially available external display device mounting a memory, such as an SSD (Solid State Drive), capable of high-speed data recording. Such a memory is capable of recording high-capacity data, e.g., RAW moving image data (uncompressed moving image data), which a low recording speed memory (an SD card, a compact flash (registered trademark), or the like) mountable on the imaging device body cannot record.

SUMMARY OF THE INVENTION

It is an object of the present invention to provide an imaging device, imaging system, and imaging method capable of performing communication of image data and display control suitable for a photographer in performing photographing while communicating with an external display device and displaying a captured image.

According to a first aspect of the present invention, there is provided an imaging device comprising: an imaging sensor; a processor including a magnification processing section which magnifies a part of an image captured by the imaging sensor to generate a magnified image, a display device to display an image, and a transmission circuit to transmit an image to an external device, wherein the display device displays the magnified image generated by the magnification processing section of the processor, and wherein the transmission circuit transmits a non-magnified image not subjected to magnification processing by the magnification processing section of the processor.

According to a second aspect of the present invention, there is provided an imaging system comprising an imaging device and an external device, the imaging device including: an imaging sensor; a processor including a magnification processing section which magnifies a part of an image captured by the imaging sensor to generate a magnified image; a display device to display an image; and a transmission circuit to transmit an image to an external device, wherein the display device displays the magnified image generated by the magnification processing section of the processor, and the transmission circuit transmits a non-magnified image not subjected to magnification processing by the magnification processing section of the processor, and the external device including: a receiving circuit to receive an image transmitted from the transmission circuit; and an external display device to display the image received by the receiving circuit, wherein the external display device displays the non-magnified image.

According to a third aspect of the present invention, there is provided an imaging method comprising: performing imaging to capture an image, magnifying a part of the captured image to generate a magnified image, displaying the magnified image, and transmitting to an external device a non-magnified image not subjected to magnification processing.

According to a fourth aspect of the present invention, there is provided an imaging method in an imaging device including a display device to display an image, and a transmission circuit to transmit an image to an external device, the method comprising: performing a first determination to determine whether a mode is a moving image mode or a still image mode; performing a second determination to determine whether a mode is a magnification display mode or a non-magnification display mode; and displaying a magnified image on the display device and transmitting a non-magnified image to the external device to display it on the external device, when the moving image mode and the magnification display mode are set as the results of the first and second determinations.

DETAILED DESCRIPTION OF THE PREFERRED EMBODIMENTS

Hereinafter, as an embodiment of the present invention, an example of an imaging device combining an imaging device body and an external display device will be described. The external display device according to the present embodiment mounts a memory, such as an SSD (Solid State Device), capable of high-speed data recording, while the imaging device body mounts a low-speed data recording memory (an SD card, a compact flash (registered trademark), or the like). In recording a moving image into the memory inside the external display device, non-magnification display is performed on the external display device even if a photographer has set magnification display on the imaging device body.

Further, in the present embodiment, a magnified live view image is displayed on a rear TFT of the imaging device body, while a normal live view image is displayed on the external display device. That is, in a case of performing a moving image photographing, a magnified live view is displayed on the rear TFT close to an operation section of the imaging device. A photographer can, for example, change the expanded position or adjust the focus position with a lens operation while viewing a magnified live view, and thus can perform the operation more intuitively. That is, in the present embodiment, in performing a moving image photographing while displaying a magnified live view, a magnified live view image is displayed on the rear TFT, while a non-magnified moving image is transmitted to the external display device to display a normal live view image.

The configurations of an imaging device 100 and an external device 200 according to the present embodiment will be described by use of FIG. 1A and FIG. 1B. The imaging device 100 corresponding to an imaging device body is assumed to be a digital camera or the like. This imaging device 100 includes a lens 101, an image sensor 102, a memory 103, a first image processing section 104, a second image processing section 105, a first switching section 106, a second switching section 107, a recording section 108, a transmission section 109, a display section 110, an operation section 111, and a system control section 112.

The lens 101 is a photographing lens for forming a subject image, and includes a mechanism for driving the lens to the optical axis direction inside the imaging device 100 so as to be able to change the zoom magnification and adjust the focus. Further, an aperture mechanism is provided inside the lens 101 so as to be able to adjust the amount of light incident upon the image sensor 102.

The image sensor 102 is arranged on the optical axis of the lens 101 and near the position where a subject image is formed. The image sensor 102 is an image sensor, such as a single plate-type CMOS image sensor or a CCD image sensor of a Bayer array filter, and photoelectrically converts a received optical image. This photoelectrically converted signal is read as a pixel signal. Note that, processing, such as noise reduction such as CDS (correlated double sampling), AD conversion, or signal amplification, may be performed on a pixel signal of the image sensor 102. This processing may be performed not only inside the image sensor but also outside the image sensor. The image sensor 102 functions as an imaging device.

The memory 103 temporarily stores a pixel signal read by the image sensor 102 and the image data processed by the first and second image processing sections 104 and 105, and is an electrically-rewritable volatile memory, such as a DRAM (Dynamic Random Access Memory), an electrically-rewritable nonvolatile memory, such as a flash memory or program ROM. Various adjustment values of the imaging device, a program for a CPU inside the system control section 112, and the like in addition to the image data are also stored in the memory 103.

The first image processing section 104 includes an image processing circuit, and performs, on the image data based on a pixel signal read from the image sensor 102, various basic image processing according to the setting of the imaging device. The various basic image processing includes, various correction processing of sensitivity, shading, white balance, defect, and the like, demosaicing, color processing, gradation correction, and the like.

The second image processing section 105 includes an image processing circuit, performs processing, such as cutting-out and/or resizing, on the image data processed by the first image processing section 104 to generate an image for magnification display (hereinafter, referred to as a "magnified image"). The magnification processing causes less degradation in image quality because it is performed using the captured image (all pixels) data of a full angle of view. The image transmitted to the external device 200 from the imaging device 100 is resized and converted from the captured all-pixel information to a format suitable for recording or displaying. Although image quality will degrade if magnification processing is further performed on a part of the converted image, such degradation can be prevented if the magnification processing is performed by the second image processing section 105 inside the imaging device 100. The image processing circuit inside the second image processing section 105 functions as a processor including a magnification processing section which magnifies a part of the image captured by the imaging device to generate a magnified image.

The first switching section 106 includes a switching circuit and outputs, in response to an instruction of the system control section 112, either an output image (non-magnified image) of the first image processing section 104 or an image (magnified image) subjected to the magnification processing by the second image processing section, to the transmission section 109. The first switching section 106 functions as a transmission switching section to control which one of the magnified image and the non-magnified image is transmitted to the external device.

Figure 2:
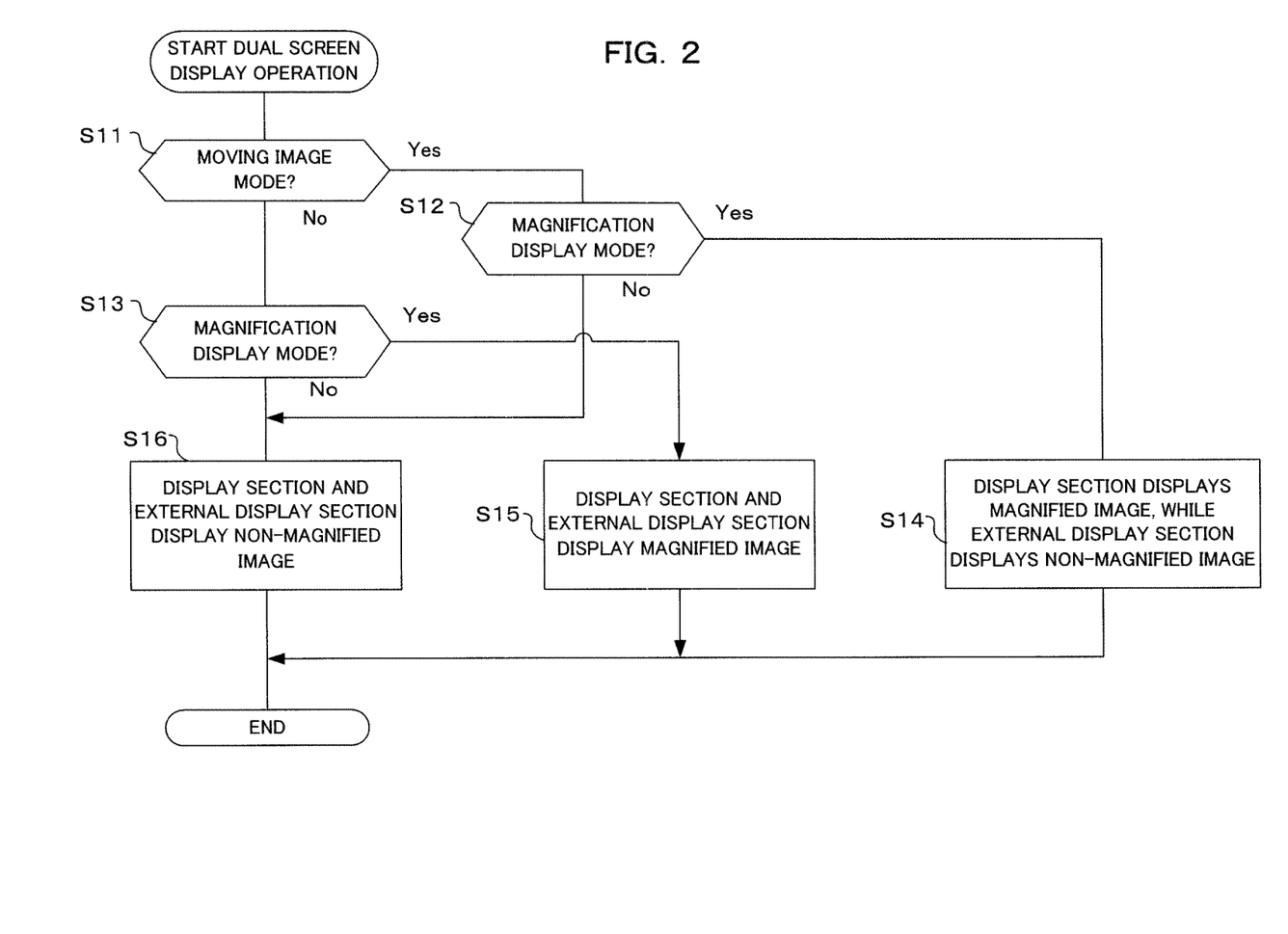
FIG. 2 is a flow chart illustrating the operation of the imaging device according to an embodiment of the present invention.

Further, when a moving image photographing mode is set and a setting is made to display a magnified image on the display section, this transmission switching section controls the transmission section to transmit the non-magnified image data (e.g., see S11 Yes→S12 Yes→S14 of FIG. 2). When a still image photographing mode is set and a magnified image is displayed on the display section, the transmission switching section controls the transmission section to transmit the magnified image (e.g., see S11 No→S13 Yes→S15 of FIG. 2).

Furthermore, when a setting is made to display a non-magnified image on the display section, this transmission switching section controls the transmission section to transmit the non-magnified image (e.g., see S12 No, S13 No, S16 of FIG. 2).

The second switching section 107 includes a switching circuit, and outputs, in response to an instruction of the system control section 112, either a magnified image or a non-magnified image to the display section 110. The second switching section 107 functions as a display switching section to control which one of the magnified image or the non-magnified image is displayed on the display section.

The recording section 108 is a semiconductor memory, such as an SD card or a compact flash (registered trademark), which is mountable on the main body of the imaging device 100 and also portable, and records moving-image data and/or still-image data, such as RAW data or JPEG. Further, in response to a user operation, the recording section 108 converts an image processed by the first image processing section 104 to an image format (YC420 or the like) suitable for recording and performs compression processing (H.264 or the like) for recording.

The transmission section 109 includes a communication circuit, and performs communication between the imaging device 100 and the external device 200 by wired or wireless communication, and transmits to the external device 200 the image data output from the first switching section. The transmission section 109 communicates through HDMI (registered trademark) or USB in a case of wired communication, and communicates through Wifi or the like in a case of wireless communication, and converts image data into an image format for transmission and transmits the resulting image data. Further, it also transmits audio data in moving image photographing. The communication circuit inside the transmission section 109 functions as a transmission circuit to transmit an image to the external device. This transmission circuit transmits a non-magnified image not subjected to the magnification processing by the magnification processing section (e.g., see S16 of FIG. 2 and FIG. 3A).

The display section 110 is a rear panel installed on the rear surface or the like of the imaging device 100, or an EVF (electronic view finder) arranged at a position observable through an eyepiece section. The display section 110 displays a live view image, a reproduced image, and the like based on the image data processed by the first image processing section 104 or the second image processing section 105. Live-view display is performed in an image format and at a frame rate, such as 60 fps of VGA resolution or 120 fps of XGA resolution, suitable for the display device. The display section 110 functions as a display device for displaying an image. This display device displays the magnified image generated by the magnification processing section (e.g., see S14, S15 of FIG. 2, and FIG. 3B and FIG. 3C).

The operation section 111 includes a switch, a dial and the like built in the imaging device 100 and/or a touch panel provided in the rear panel, and accepts the operation of a photographer. For example, whether the display section is made to perform magnification display or non-magnification display may be set in a menu screen or the like, or may be set with a switch, a dial or the like. Further, with the operation of the operation section 111, similarly a still image mode or a moving image mode is also set. The operation section 111 functions as a controller having a photographing mode setting section to set either a still image photographing mode or a moving image photographing mode.

Figure 1A:
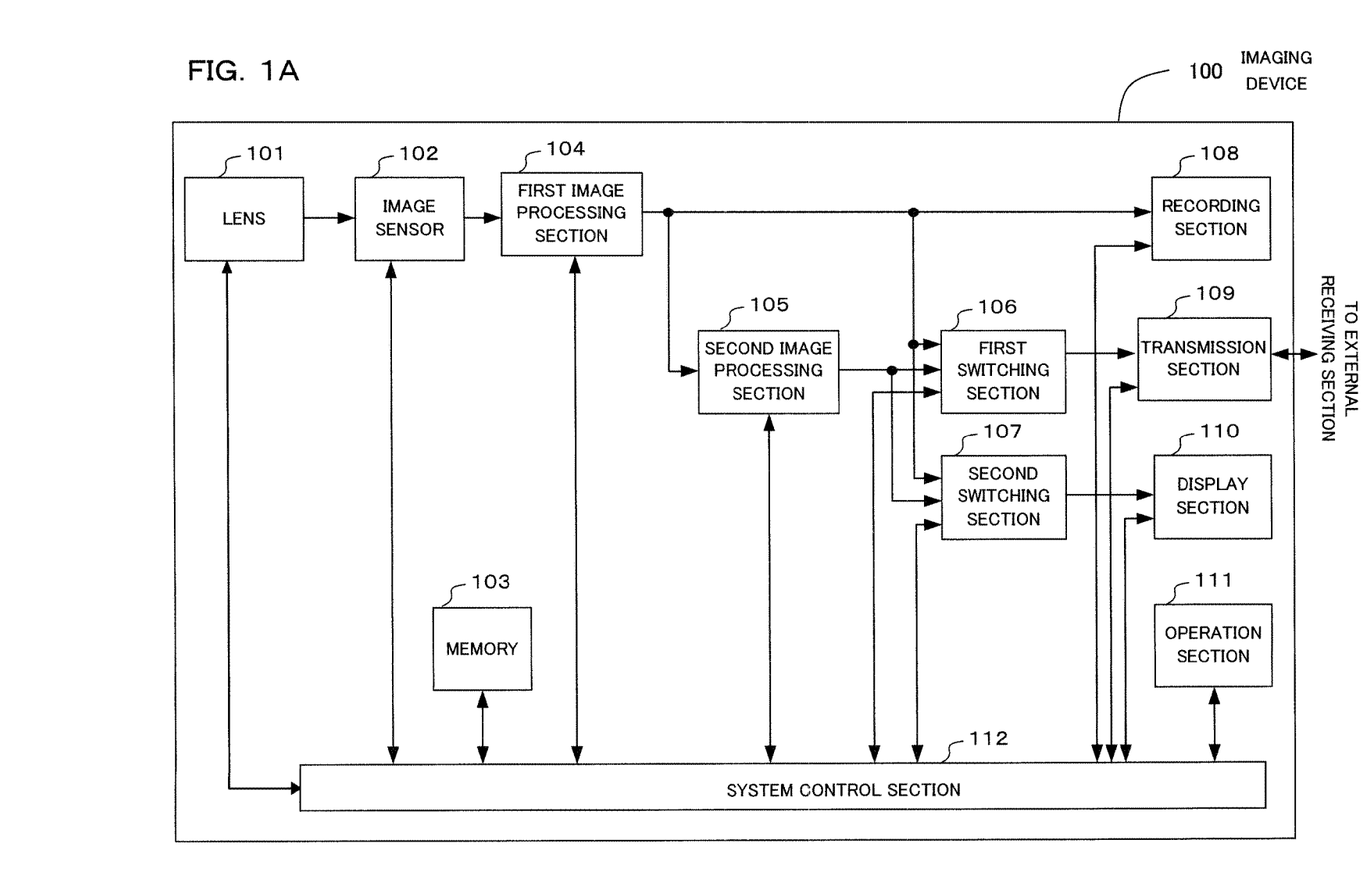
FIG. 1A is a block diagram mainly illustrating an electric configuration of an imaging device according to an embodiment of the present invention.

Note that, in the example illustrated in FIG. 1A, the operation section 111 is provided in the imaging device 100, but not limited thereto, and for example, it obviously does not matter if the information about the operation of a photographer is wirelessly communicated from a remote release, a smartphone, a tablet terminal, or the like, and the operation of the photographer is accepted.

The system control section 112 includes a CPU (Central Processing Unit) and its peripheral circuit, and controls the whole imaging device 100 in accordance with a program stored in the memory 103.

Figure 1B:
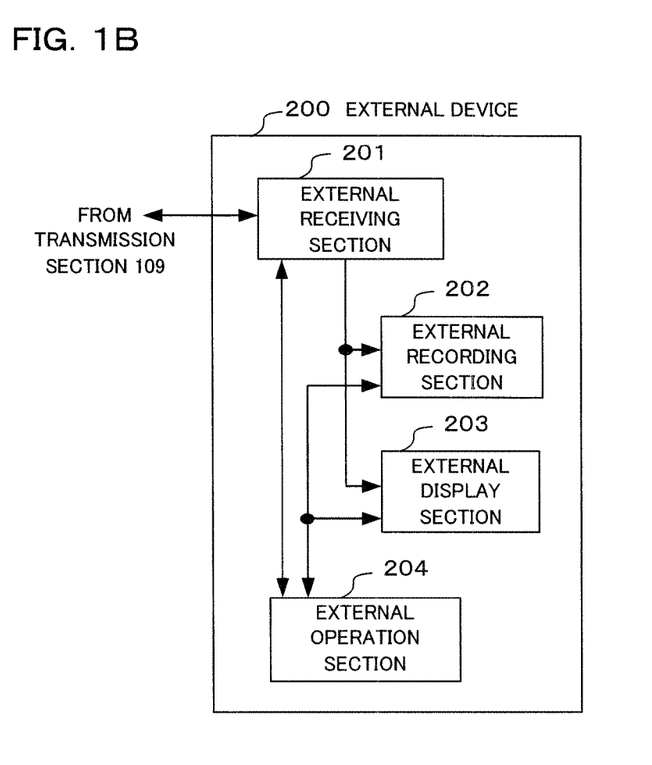
FIG. 1B is a block diagram mainly illustrating an electric configuration of an external display device according to an embodiment of the present invention.

The external device 200 illustrated in FIG. 1B receives the image data transmitted from the imaging device 100, and performs recording and/or display. This external device 200 includes an external receiving section 201, an external recording section 202, an external display section 203, and an external operation section 204.

The external receiving section 201 includes a communication circuit, communicates with the imaging device 100, and receives the image data transmitted by the transmission section 109. A communication circuit inside the external receiving section 201 functions as a receiving circuit to receive the image transmitted from the transmission circuit.

The external recording section 202 includes a memory, such as an HDD (Hard Disk Drive) or a SSD (Slid State Device), capable of high speed signal recording and a recording circuit, and records the image received by the external receiving section 201. In the external display section 203, a magnified live view or a non-magnified live view is displayed based on the image data from the imaging device 100. On the other hand, in the external recording section 202, when the moving image mode is set, non-magnified image data is always recorded independently of the magnification display mode. Therefore, in a moving image photographing, the transmission section 109 transmits non-magnified image data as well in transmitting the image data for magnification display. The recording circuit of the external recording section 202 functions as an external recording circuit to record the image received by the receiving circuit. This external recording circuit records the non-magnified image in the memory.

The external display section 203 is a display (liquid crystal display or the like) larger than the display section 110 of the imaging device 100 and capable of high-definition (e.g., 1080 HD, 60 fps) display and displays an image based on the image data received by the external receiving section 201. The external operation section 204 is a switch or the like or is a touch panel attached to the external display section 203, and accepts the operation of a photographer to the external device 200. The external display section 203 functions as an external display device to display the image received by the receiving circuit.

Figure 3A:
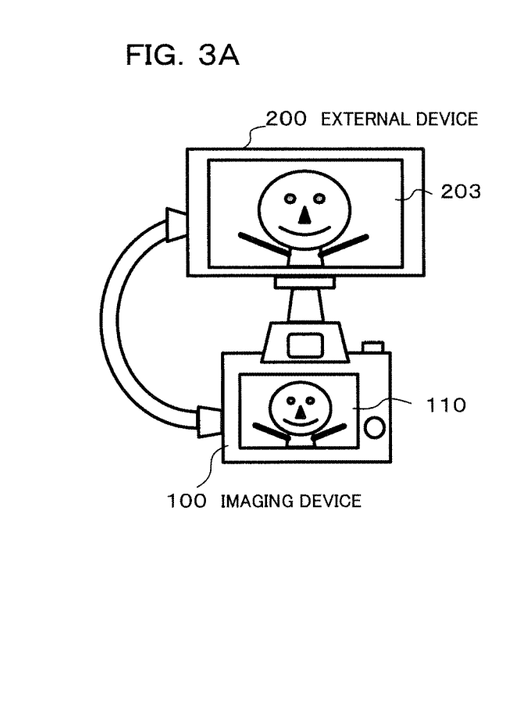
FIG. 3A to FIG. 3C illustrate an example of live-view display in the imaging device and external display device according to an embodiment of the present invention.
Figure 3B:
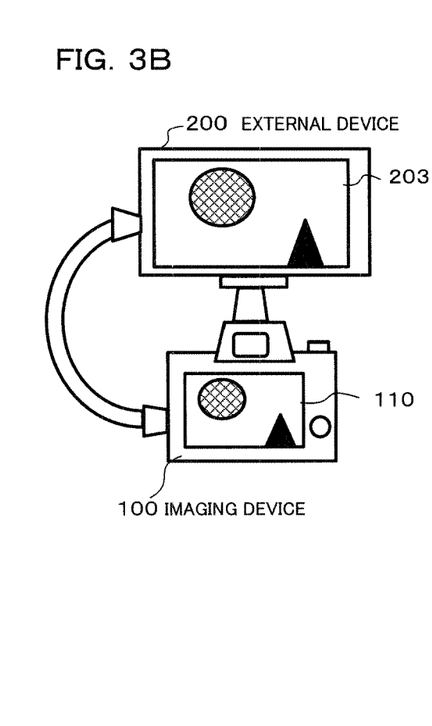
Figure 3C:
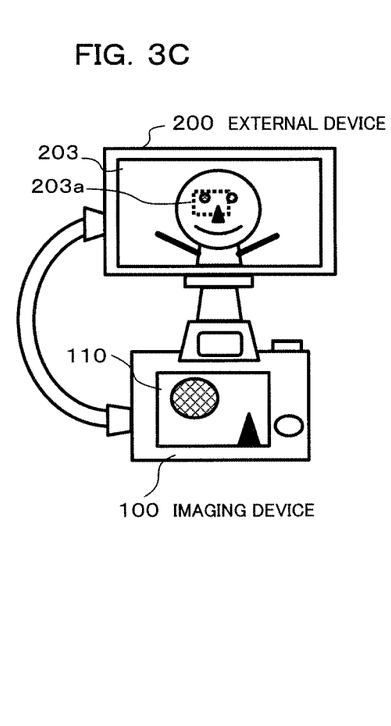

This external display device displays a non-magnified image (e.g., see S16, S14 of FIG. 2, and FIG. 3A and FIG. 3C). Moreover, this external display device displays, when the imaging device is set to a moving image photographing mode and a setting is made to display the magnified image on the display device, the non-magnified image received by the receiving circuit (e.g., see S11 Yes→S12 Yes→S14 of FIG. 2, and FIG. 3C).

Further, this external display device displays, when the imaging device is set to a still image photographing mode and a setting is made to display the magnified image on the display device, the magnified image received by the receiving circuit (e.g., see S11 No→S13 Yes→S15 of FIG. 2, and FIG. 3B). Moreover, this external display device displays, when the imaging device is set to display a non-magnified image on the display device, a non-magnified image received by the receiving circuit. (e.g., see S12 No, S13 No, S16 of FIG. 2, and FIG. 3A).

Next, a dual screen display operation in the present embodiment will be described by use of the flowchart illustrated in FIG. 2. This flow is performed by the CPU inside the system control section 112 in accordance with a program stored in the memory 103.

The operation sequence illustrated in FIG. 2 illustrates the operation when the power supply of the imaging device 100 is activated and an image read by the image sensor 102 is displayed as a live view on the display section 110. The flow starts from a state where the imaging device 100 and the external device 200 are connected via wired or wireless communication and display of a live view image is started on two screens of the display section 110 and external display section 203.

Once the flow illustrated in FIG. 2 starts, it is first determined whether or not the mode is the moving image mode (S11). A photographer previously selects, via the operation section 111, whether the photographing mode is set to the moving image photographing mode or the still image photographing mode and inputs the selected mode. For example, a mode dial or the like is provided inside the operation section 111 so that a photographer selects the mode by rotating the dial. In this step, the system control section 112 detects, based on the operation state of the operation section 111, whether or not the selected mode is the moving image mode.

If the selected mode is the still image mode but not the moving image mode (S11: No) as the result of the determination in step S11, it is then determined whether or not the magnification display mode is set (S13). Here, the system control section 112 performs determination based on the operation state of the operation section 111.

On the other hand, if the selected mode is the moving image mode as the result of the determination in step 11, it is determined whether or not the magnification display mode is set (S12), as in step S13. Here, the system control section 112 detects, based on the operation state of the operation section 111, whether or not a live-view display on the display section 110 is set to the magnification display.

If the magnification display mode is not set as the result of the determination in step S12 (S12: No) or if the magnification display mode is not set as the result of the determination in step S13 (S13: No), the display section and the external display section display a non-magnified image (S16). This determination condition is satisfied in a case where the still image mode and the non-magnification display mode are set in the imaging device 100 (S11 No→S13 No) or in a case where the moving image mode and the non-magnification display mode are set in the imaging device 100 (S11 Yes→S12 No). In this case, a non-magnified image output by the first image processing section 104 via the second switching section 107 is displayed on the display section 110 inside the imaging device 100. Further, a non-magnified image output by the first image processing section 104 via the first switching section 106 is transmitted to the external display section 203 inside the external device 200 from the transmission section 109. The external receiving section 201 receives the non-magnified image and displays this non-magnified image. That is, a normal live view image of the non-magnified image is displayed both on the display section 110 and on the external display section 203. Specifically, as illustrated in FIG. 3A, an entire image of a subject is displayed on the display section 110 and on the external display section 200 as a normal live view.

If the magnification display mode is set as the result of the determination in step S13, a magnified image is displayed on the display section and on the external display section (S15). This determination condition is satisfied in a case where the still image mode and the magnification display mode are set in the imaging device 100 (S11 No→S13 Yes). In this case, a magnified image output by the second image processing section 105 via the second switching section 107 is displayed on the display section 110 inside the imaging device 100. Further, a magnified image output by the second image processing section 105 via the first switching section 106 is transmitted to the external display section 203 inside the external device 200 from the transmission section 109. The external receiving section 201 receives the magnified image and displays this magnified image. That is, a normal live view image of the magnified image is displayed both on the display section 110 and on the external display section 203. Specifically, as illustrated in FIG. 3B, a part (face) of a subject is displayed on the display section 110 and on the external display section 200 as a magnified live view.

If the magnification display mode is set as the result of the determination in step S12, a magnified image is displayed on the display section and a non-magnified image is displayed on the external display section (S14). This determination condition is satisfied in a case where the moving image mode and the magnification display mode are set in the imaging device 100 (S11 Yes→S12 Yes). In this case, a magnified image output by the second image processing section 105 via the second switching section 107 is displayed on the display section 110 inside the imaging device 100. Further, a non-magnified image output by the first image processing section 104 via the first switching section 106 is transmitted to the external display section 203 inside the external device 200 from the transmission section 109. The external receiving section 201 receives the non-magnified image and displays this non-magnified image. That is, a magnified live view image is displayed on the display section 110, while a normal live view image is displayed on the external display section 203.

Specifically, as illustrated in FIG. 3C, a partially-magnified image (face) is displayed on the display section 110 as a magnified live view, while the entire image of a subject is displayed on the external display section 203 as a normal live view. Note that, in FIG. 3C, a broken line frame 203a indicates a portion to be magnified and displayed on the display section 110 of the imaging device 100. This allows a photographer to intuitively know at which position in the entire image the portion being magnified and displayed on the display section 110 exists.

After a live view image is displayed on the display section 110 and on the external display section 203 in steps S14 to S16, the flow illustrated in FIG. 2 ends.

Then, display on the display section 110 of the imaging device 100 and display on the external display section 203 of the external device 200 in the present embodiment will be described by use of FIG. 3.

FIG. 3A is the case where both the external device 200 and the imaging device 100 display a full angle of view image. This state is the default state during startup, regardless of the photographing mode. With respect to a subject varying every moment, generally focus is AF or the like which is adjusted by the camera and a user just adjusts the angle of view. In confirming the focus and/or performing the focus adjustment during photographing, the display form of FIG. 3B or FIG. 3C is preferable depending on the photographing mode.

FIG. 3B is the case where in the still image mode both the external device 200 and the imaging device 100 display a partially-magnified image. In the still image photographing, it is preferable to precisely adjust the focus onto a main subject. In performing the focus adjustment for magnification display, a subject is substantially still and a camera work is also often fixed. In order to concentrate on focus adjustment, just magnification display may be required at the time of focus adjustment. Precisely adjusting the focus onto a subject in a stationary state by fixing a camera to a tripod or the like often happens in photographing things and/or in remote photographing in a studio. In this case, because an image is confirmed and photographed on the external display device side, a magnified image is preferably displayed on the external display device.

FIG. 3C is the case where in the moving image mode the external device displays a full angle of view image while the imaging device displays a partially-magnified image. During hand-held photographing, because the focus adjustment is performed by a touch operation and/or lens operation in the rear panel while holding the imaging device, performing magnification display on the imaging device side close to the operation section is more intuitive and preferable. Further, during the moving image photographing, photographing is often performed with a slow camera work, such as pan, on a subject varying every moment and it is therefore preferable to be able to simultaneously confirm both the angle of view and the focus. During the moving image photographing, continuing to always-accurately adjust the focus onto a subject varying every moment is difficult so it is more preferable to first confirm so as not to continue photographing for a long time in an out-of-focus state. Furthermore, when a photographer wishes to record a moving image with a high image quality using the external device 200, an entire image is preferably transmitted to the external device 200 from the imaging device 100 regardless of the presence or absence of the magnification processing of the imaging device 100.

As described above, the imaging device in the present embodiment includes a display section to display an image, and a transmission section to transmit the image to the external device. Then, the first determination step of determining whether the mode is the moving image mode or the still image mode is performed (e.g., see S11 of FIG. 2), and the second determination step of determining whether the mode is the magnification display mode or the non-magnification display mode is performed (e.g., S12, S13 of FIG. 2). If the moving image mode and the magnification display mode are set as the result of the determinations in the first and second determination steps, the displaying step of displaying a magnified image on the display section and transmitting a non-magnified image to the external device is performed (e.g., see S14 of FIG. 2). Therefore, in performing photographing while communicating with the external display device and displaying a captured image, the communication and display control of the image data suitable for a photographer can be performed. In particular, in the present embodiment, optimal display can be performed in a combination of the moving image/still image modes and the magnification display/non-magnification display modes.

Further, in the present embodiment, in a case of performing photographing while displaying a magnified live view in the moving image photographing, the magnified live view is displayed on the display section 110 while a normal live view is displayed on the external display section 203 (see, S11 Yes→S12 Yes→S14). Moreover, in a case of performing photographing while displaying a magnified live view in the still image photographing, a magnified live view is displayed both on the display section 110 and on the external display section 203 (see, S11 No→S13 Yes→S15). Furthermore, if the display setting of a magnified live view is not selected, a normal live view is displayed both on the display section 110 and on the external display section 203 (S12 No→S16, or S13 No→S16).

Further, in the present embodiment, if photographing is started in the moving image photographing mode, a moving image is recorded on either one or both of the recording section 108 and the external recording section 202 depending on the setting of a photographer. If the recording section 108 is a memory, such as an SD card, corresponding to lower-speed recording, the first image processing section 104 will generate an image compressed down to the data band (e.g., not more than 10 MB/s) optimal for the transmission speed and record the compressed image data in the recording section 108.

On the other hand, if the external recording section 203 is a memory, such as an SSD or HDD, corresponding to higher speed signal recording, the first image processing section 104 will generate a high-quality image (e.g., a moving image of a bit rate exceeding 30 MB/s and/or an uncompressed RAW moving image) and record the resulting image in the external recording section 202. The data band of a moving image recorded in each recording section may be made variable within a range of the bandwidth in which the recording section can record.

Further, in the present embodiment, a photographer can, for example, change an expanded position or adjust the focus position by the lens operation while viewing a magnified live view image in the moving image photographing. If the display section 110 (rear TFT) is arranged at a position close to the operation section of the imaging device 100 and a live view image is displayed there, a photographer can more intuitively perform the operation.

Furthermore, in the present embodiment, because a normal live view is displayed on the external device 200, it is possible to perform photographing after confirming a change of the composition while moving the imaging device 100 simultaneously with focus adjustment or the like. That is, because a photographer often performs the focus adjustment with a magnified live view image displayed on the display section 110 of the imaging device 100 and confirms the composition with a normal live view image displayed on the display section 203 of the external device 200, the live-view display suitable for moving image photographing can be performed with the imaging device according to the present embodiment.

Moreover, in the still image photographing, unlike in the moving image photographing, a photographer usually stops, after determining the composition by moving the imaging device, the imaging device and precisely adjusts the focus position and performs photographing. Therefore, only magnification display may be performed in performing the focus adjustment. Further, in taking a picture of a stationary object while fixing the imaging device to a tripod or the like or in taking a picture in a studio, a photographer often precisely performs the focus adjustment while confirming a live view image on the external device. In such a case, the photographer can concentrate on the focus adjustment while confirming a preferred screen.

In addition, when a magnified live view is not set or when magnification display is not required because AF (auto-focusing) is set and the imaging device performs auto-adjustment of the focus, a photographer can perform photographing while confirming the entire composition for both the moving image photographing and still image photographing. As described above, in the present embodiment, it is possible to switch to optimal display in conjunction with the setting of the photographing mode and magnification display set by the photographer.

Additionally, in the present embodiment, it is possible to perform optimal dual screen display in the moving image photographing. Furthermore, because the display setting of two screens automatically switches in response to setting of the photographing mode and magnification display, it is not required for a photographer to change the setting of the display section of the imaging device and the setting of the display section of the external display every time he/she changes the setting, so that the usability will be improved.

Furthermore, in the moving image photographing, moving image recording in the data band suitable for the recording section of each of the imaging device and the external device is enabled. A non-magnified image can be transmitted to the external recording section regardless of whether or not the magnified live-view display is set, and thus high-speed and high-capacity moving image data which cannot be recorded by the recording section of the imaging device can be recorded.

Note that, in the present embodiment, the external device 200 includes the external recording section 202, but may obviously exclude it. Even in this case, provision of the external display section 203 allows for an optimal combination of displays.

Further, the transmission section 109 transmits a magnified image or a non-magnified image depending on an output from the first switching section 106, but not limited thereto, and for example, it may transmit the image data of a non-magnified image and the information on an image (i.e., a magnified image or a non-magnified image) displayed on the external display section 203, so that in a case of displaying the magnified image, the external device 200 may generate and display a magnified image based on the received information. However, in this case, an image for magnification display will degrade as compared with the present embodiment.

Furthermore, in the present embodiment, the first image processing section 104, the second image processing section 105, the first switching section 106, the second switching section 107, and the like are configured separately from the system control section 112. However, it is needless to say that all or a part of each section may be configured by software and performed by the CPU inside the system control section 112. Moreover, each section inside the external device 200 may be configured through software by a CPU and a program other than hardware circuitry and discrete components, or may be configured by use of a DSP (Digital Signal Processor). Obviously, these may be combined as needed. Moreover, the functions inside the imaging device 100 and/or external device 200 may be implemented by hardware, such as a gate circuit, which is generated based on a programming language described in Verilog, or may be implemented by using a hardware configuration utilizing software of a DSP (Digital Signal Processor) or the like. Obviously, these may be combined as needed.

Moreover, in the present embodiment, as the device for photographing, an imaging device has been used and described, but as the imaging device, the camera may be a digital single-lens reflex camera or a compact digital camera, or may be a camera for moving image such as a video camera or a movie camera, or may be a camera which is built in a mobile phone, a smartphone, a portable information terminal, a personal computer (PC), a tablet type computer, a game device, or the like. In any case, the present invention can be applicable to any imaging device which is used in combination with an external device.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device comprising:
   an imaging sensor;
   a processor including a first image processing section which generates a non-magnified image using image processing that does not perform magnification processing from image data that was acquired by the imaging sensor, at the time of movie shooting or at the time of live view display, and a magnification processing section which magnifies a part of the non-magnified image to generate a magnified image;
   a display device to display an image;
   a transmission circuit to transmit an image to an external device that has a screen that is larger than the display device, and that displays an image in high definition;
   a transmission switching section; and
   a controller,
   wherein the display device includes a display switching section to control which one of the magnified image and the non-magnified image is displayed,
   wherein the transmission switching section is configured to control which one of the magnified image and the non-magnified image is transmitted and the controller has a photographing mode setting section which sets one of a still image photographing mode and a moving image photographing mode, and
   wherein the transmission switching section, when a moving image photographing mode is set and a setting is made to display the magnified image on the display device, controls the transmission circuit to transmit the non-magnified image data, and when a still image photographing mode is set and the magnified image is displayed on the display device, controls the transmission circuit to transmit the magnified image.

2. The imaging device according to claim 1,
wherein when a setting is made so as to display the non-magnified image on the display device, the transmission switching section controls the transmission circuit to transmit the non-magnified image.

3. The imaging device according to claim 2, further comprising an operation section for changing an expanded position within an image being magnified, wherein the operation section is provided closer to the display device of the imaging device than to the screen of the external device.

4. The imaging device according to claim 2, further comprising an operation section for adjusting a focus, wherein the operation section is provided closer to the display device of the image device than to a screen of the external device.

5. An imaging system comprising an imaging device and an external device,
the imaging device including:
an imaging sensor;
a processor including a first image processing section which generates a non-magnified image using image processing that does not perform magnification processing from image data that was acquired by the image sensor, at the time of moving shooting or at the time of live view display, and a magnification processing section which magnifies a part of the non-magnified image to generate a magnified image;
a display device to display an image; and
a transmission circuit to transmit an image to the external device for displaying an image,
the external device including:
a receiving circuit to receive an image transmitted from the transmission circuit; and
an external display device to display the image received by the receiving circuit,
wherein the external display device:
has a large screen compared to the display device, and is capable of high-definition display;
displays the non-magnified image received by the receiving circuit, when the imaging device is set to a moving image photographing mode and a setting is made to display the magnified image on the display device of the imaging device; and
displays the magnified image received by the receiving circuit, when the imaging device is set to a still image photographing mode and a setting is made to display the magnified image on the display device.

6. The imaging system according to claim 5,
wherein the external display device displays the non-magnified image received by the receiving circuit, when the imaging device is set to display the non-magnified image on the external display device of the imaging device.

7. The imaging system according to claim 5,
the external device further including:
an external recording circuit to record an image received by the receiving circuit, wherein
the external recording circuit records the non-magnified image.

8. An imaging method in an imaging device including a display device to display an image, and a transmission circuit to transmit an image to an external device, the method comprising:

performing a first determination to determine whether a mode is a moving image mode or a still image mode;
performing a second determination to determine whether a mode is a magnification display mode or a non-magnification display mode; and
displaying a magnified image on the display device and transmitting a non-magnified image to the external device to display it on the external device, when the moving image mode and the magnification display mode are set as the results of the first and second determinations.

9. A non-transitory computer-readable medium storing a processor executable code, which when executed by at least one processor, performs an imaging method, the imaging method comprising:
performing imaging to capture an image at the time of movie shooting or at the time of live view display,
magnifying a part of the captured image to generate a magnified image,
determining whether a currently set photography mode is a still image photographing mode or a moving image photographing mode,
determining whether a currently set display mode is a magnification display mode or a non-magnification display mode, and
displaying a magnified image on the display device and transmitting a non-magnified image to the external device to display it on the external device, responsive to determining that both the moving image photographing mode is set and the magnification display mode is set.

10. An imaging system comprising:
a) an external display device including
1) a receiver, and
2) an external display; and
b) an imaging device including
1) an image sensor for generating image data,
2) an image processor processing the image data generated by the image sensor to generate both (i) unmagnified processed image data and (ii) magnified processed image data,
3) a display,
4) a transmitter for transmitting data to the receiver of the external display device, and
5) a controller which
determines whether a magnification display mode of the image device is (A) a still image mode or (B) a moving image mode, and
when it is determined that the magnification display mode of the image device is a still image mode, causes the display to display the magnified processed image data and causes the transmitter to transmit to the external display device, the magnified processed image data for display on the external display, and
otherwise, when it is determined that the magnification display mode of the image device is a moving image mode, causes the display to display the magnified processed image data and causes the transmitter to transmit to the external display device, the unmagnified processed image data for display on the external display.

* * * * *